United States Patent [19]

Morgan

[11] Patent Number: 5,203,088
[45] Date of Patent: Apr. 20, 1993

[54] METHOD AND MACHINE FOR THE ENGRAVING OF ARTICLES

[76] Inventor: Andersson Morgan, AB Autoengraving, Kougsta Gård, Häggenås, S-830 30 Lit, Sweden

[21] Appl. No.: 781,199

[22] PCT Filed: May 17, 1990

[86] PCT No.: PCT/SE90/00331
§ 371 Date: Dec. 13, 1991
§ 102(e) Date: Dec. 13, 1991

[87] PCT Pub. No.: WO90/15723
PCT Pub. Date: Dec. 27, 1990

[30] Foreign Application Priority Data

Jun. 15, 1989 [SE] Sweden .................... 8902158

[51] Int. Cl.⁵ ............................. B43L 9/00
[52] U.S. Cl. ..................... 33/21.1; 33/24.1
[58] Field of Search .......... 33/18.1, 18.2, 21.1, 33/21.4, 24.1, 24.2

[56] References Cited

U.S. PATENT DOCUMENTS

| | | | |
|---|---|---|---|
| 4,146,966 | 4/1979 | Levine et al. | 33/18.1 |
| 4,166,319 | 9/1979 | Rosenberg | 33/18.1 X |
| 4,254,552 | 3/1981 | Samis | 33/18.1 |
| 4,854,205 | 8/1989 | Anderka | 33/18.1 X |

Primary Examiner—William A. Cuchlinski, Jr.
Assistant Examiner—Alvin Wirthlin
Attorney, Agent, or Firm—Pollock, Vande Sande & Priddy

[57] ABSTRACT

The engraving of an article with a curved surface is carried out at an order site. Engraving instructions are sent into computer equipment which controls an engraving machine by means of control signals which depend on the input instructions. The engraving machine comprises a rotatably arranged member in which the article is secured. The control signals are received in the engraving machine by control members which control the rotatable member and a device supporting an engraving tool. The rotatable member and the supporting device are controlled in coordination with each other in such a way that an engraving is obtained on the curved surface of the article.

10 Claims, 3 Drawing Sheets

METHOD AND MACHINE FOR THE ENGRAVING OF ARTICLES

FIELD OF THE INVENTION

The present invention relates to a method for carrying out, at an order site, the engraving of an article with a curved surface, for example a ring, in which the orderer sends to the order site instructions regarding the article and the engraving, and in which an article in accordance with such instructions is produced, or is selected from among articles produced beforehand, and is applied into computer-controlled engraving equipment. The latter can be supplied with the engraving instructions and is designed to emit corresponding control signals to an engraving machine forming part of the equipment. The present invention also relates to an engraving machine for carrying out the method. The machine can be controlled by means of the control signals from the computer equipment, in which the engraving instructions for the article with the curved surface can be input.

BACKGROUND OF THE INVENTION

The engraving of rings, for example, has hitherto normally been carried out in the shop in which the ring or similar article is offered for sale. The ring engraving has in this respect been carried out manually and has hitherto constituted a genuine craft.

Computer-controlled engraving equipment is previously known, and it is also known to use control signals from computer equipment to control engraving on the flat surfaces of articles. The control signals in this respect control the head of an engraving needle which is brought into cooperation with the material of the article and is then guided along the article.

There is a general requirement to simplify and improve the selling and other handling of rings and similar articles which are to be provided with some kind of custom engraving. The production of the article or ring and the engraving thereof have hitherto been carried out at different sites, and great gains in terms of simplification are to be made by being able to coordinate these operations effectively.

There is also a requirement for an effectively operating engraving machine in which it is possible, while retaining good results, to considerably speed up the engraving work which has hitherto been carried out manually.

SUMMARY OF THE INVENTION

The aim of the present invention is to provide a method permitting more effective selling of rings and other articles with bent or curved surfaces which are to be provided with individual engravings. Instead of each shop keeping a large inventory or having its own workshop, it is proposed in accordance with the invention that only sample collections need to be kept in each shop. The taking of measurements and instructions will be carried out in the shop, and the ordering of both the ring (or the like) and the engraving will be carried out at a central site which, in addition to the production function, thus also provides the engraving service.

The feature which may principally be regarded as characterizing a method according to the invention is that the produced or selected article is secured in a member which is rotatable in its own plane and forms part of the engraving machine, in that the computer equipment is activated in order to emit the control signals which are received by first and second control members, likewise forming part of the machine, for controlling the rotatable member and a device supporting an engraving member/engraving needle, and in that the rotatable member and the engraving device are controlled in coordination by the control signals in order to obtain an engraving, corresponding to the input instructions, on the bent or curved surface of the article.

The present invention also proposes an engraving machine which makes it possible to engrave rings and other articles with curved surfaces in an effective and economical manner. The machine is preferably made in such a way that it can be adjusted to different ring diameters, ring thicknesses and the like. By using known computer equipment different type faces can be selected from this program in a known manner.

A machine which can be controlled by control signals received from the computer equipment characterized in that it comprises a member which is rotatable in its own plane, preferably disc-shaped, and is designed with attachments for the article, and in that it also comprises first and second control members which, by means of the control signals, control the rotation of the rotatable member and a device supporting an engraving member/engraving needle in coordination with each other in such a way that an engraving corresponding to the input instructions/control signals is obtained on the curved surface.

The device which supports the engraving needle or the like can is controlled essentially at right angles to the plane of rotation of the article. The rotatable member can be designed with a central recess into which that part of the device which supports the engraving member projects in order to permit cooperation between the engraving member and the surface of the article. The rotatable member can be rotated by means of a motor which, via first cooperating members (gear wheel, gear ring etc.), gives the rotatable its rotational movements, which in this respect can be in opposite directions.

The device is preferably mounted or suspended on the one end of a first lever which can be actuated via its other end by means of a motor or the like, forming part of the second control members, via second cooperating members (for example toothed arc, gear wheel etc.).

The device is preferably adjustable to different article thicknesses by means of a unit (motor) which forms part of the second control members.

The application of the engraving needle or the like against the material of the article in order to permit engraving is effected in one embodiment by means of a spring force, which can be obtained for example from a mechanical tensile spring. The raising of the engraving member counter to the action of the spring force is effected in one embodiment by means of an electromagnet.

The device is preferably designed as a second lever which is mounted at its center on the first end of the first lever. The second lever supports the engraving member at its first end and can cooperate at its other end with the spring force and the electromagnet.

In a further embodiment, the unit (motor) in the second control member can cooperate with a slide or similar member which can be adjusted by means of the unit to different displacement positions in relation to the device (the second lever). The slide or similar supports the electromagnet and, as a result of its displacement to different predetermined positions by means of the unit, it is possible to carry out the adjustment to the different article thicknesses. The effect of the unit on the slide can be achieved via a thread or the like which is screwed into and screwed out of a thread on a part coupled to the slide. The degree of screwing-in of the thread thus determines the longitudinal displacement position of the slide in relation to the device.

By means of the present invention the measurement instructions and engraving instructions can be sent to the central site, which makes use of some of the instructions in the engraving function. The engraving of different types, thicknesses and sizes of rings or the like can therefore be carried out. The rings or the like are produced or are selected from among articles already produced, after which the respective engraving can be carried out. The engraving machine operates reliably and with great speed. The engraving of a ring can be carried out in 20 seconds or less, which is to be compared to manual engraving in which a much more time has to be spent on each ring.

BRIEF DESCRIPTION OF THE DRAWINGS

A proposed embodiment of a method and an engraving machine according to the present invention will be described below with reference to the attached drawings, in which.

DESCRIPTION OF THE PREFERRED EMBODIMENT

Figure 1:
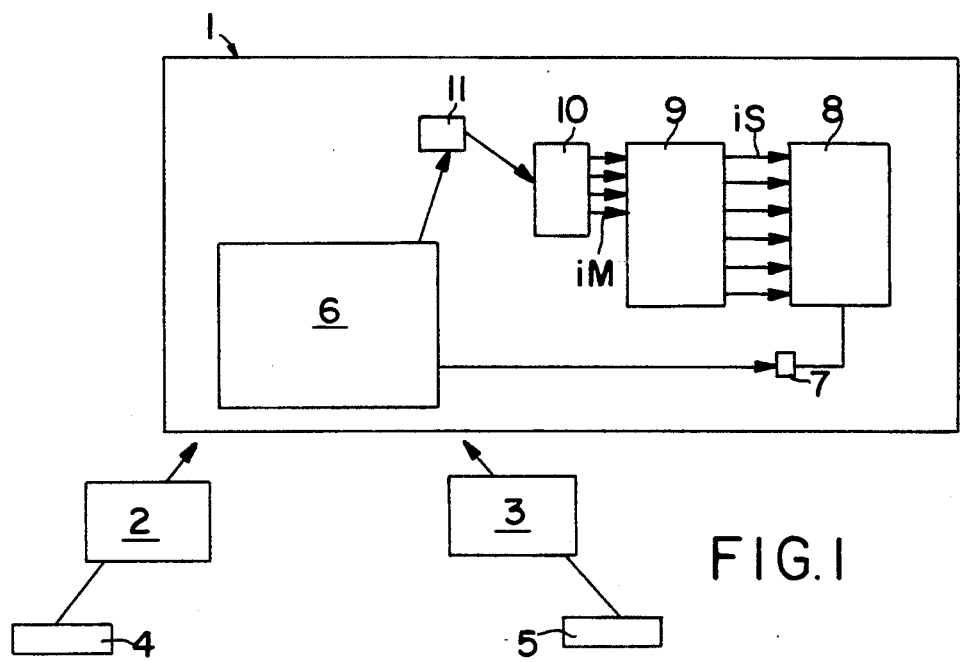
FIG. 1 shows a diagram of the handling of rings or the like at a central site.

In FIG. 1 a central site receiving orders is indicated by numeral 1. The orders can come in by telephone, by order forms 2, 3 from different shops 4 and 5 which are served by the central site, etc. Incoming orders 2, 3 can contain instructions on the articles which are to be supplied centrally and instructions on the individual customeradapted engravings with which the articles are to be provided. The central site thus comprises a production or storage unit 6 in which the articles are produced or stored. After production or selection from the store of a particular article 7, for example a ring, the latter is conveyed to an engraving machine 8 which is controlled by computer equipment 9. The computer equipment is provided with a write-in member (terminal) 10. Some of the instructions, more specifically the instructions relating to the engraving of the article 7, are transmitted to the computer equipment 9 via the write-in member 10. These transmitted instructions have been symbolized in the Figure by 11. There is thus obtained for the shops 4, 5 a centralized production and engraving service which the shops can buy. The input instructions in the unit 10 lead to input signals iM to the computer equipment. The computer equipment can send adjustment and control signals iS to the engraving machine 8.

Figure 3:
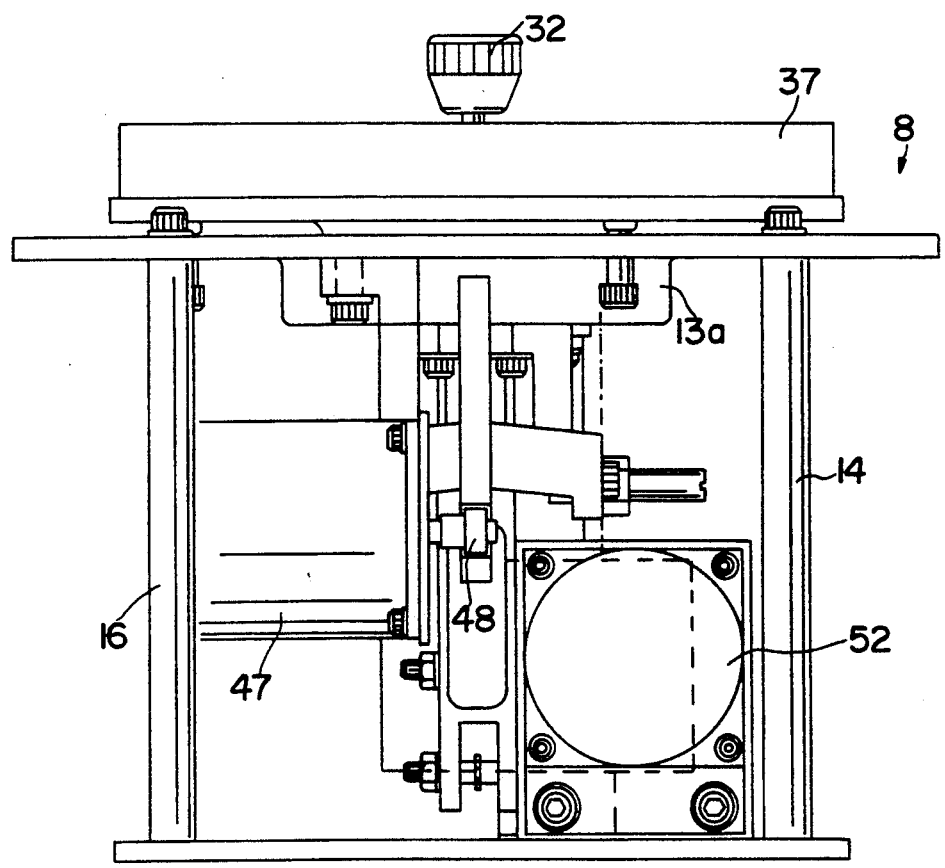
FIG. 3 shows the engraving machine according to FIG. 2 from one end.
Figure 2:
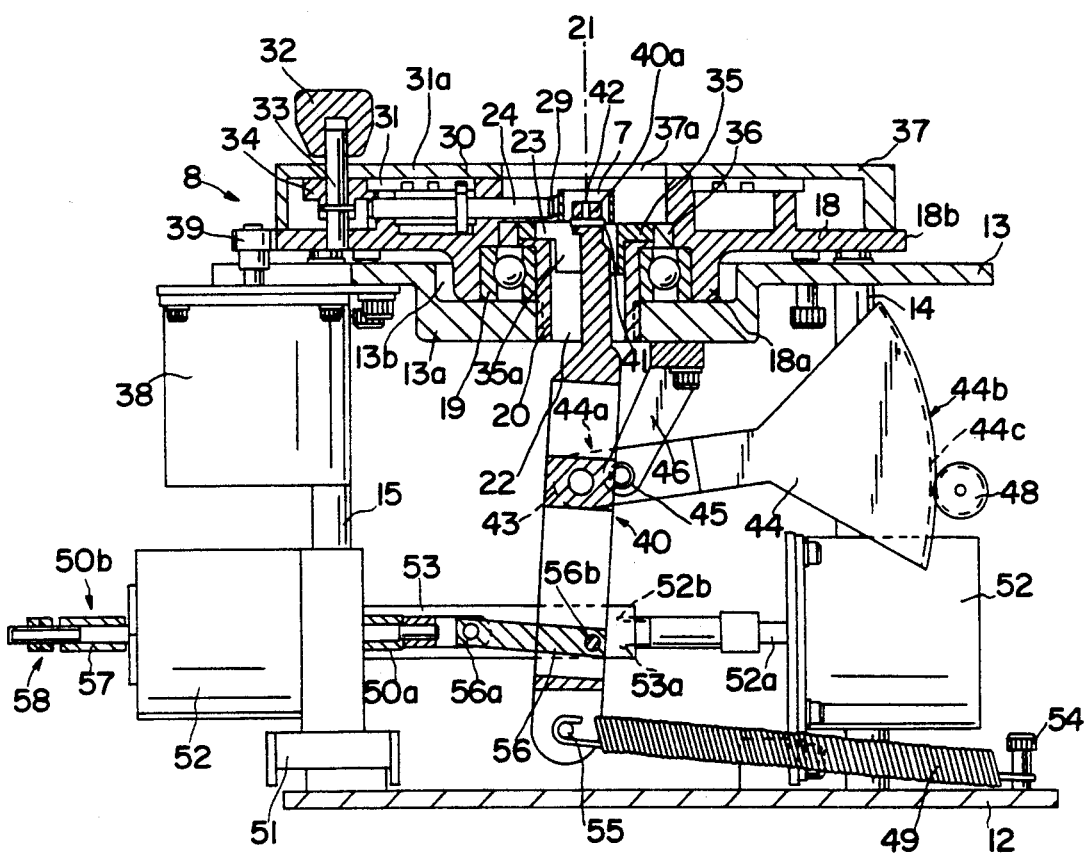
FIG. 2 shows a longitudinal section through an engraving machine of the present invention.
Figure 4:
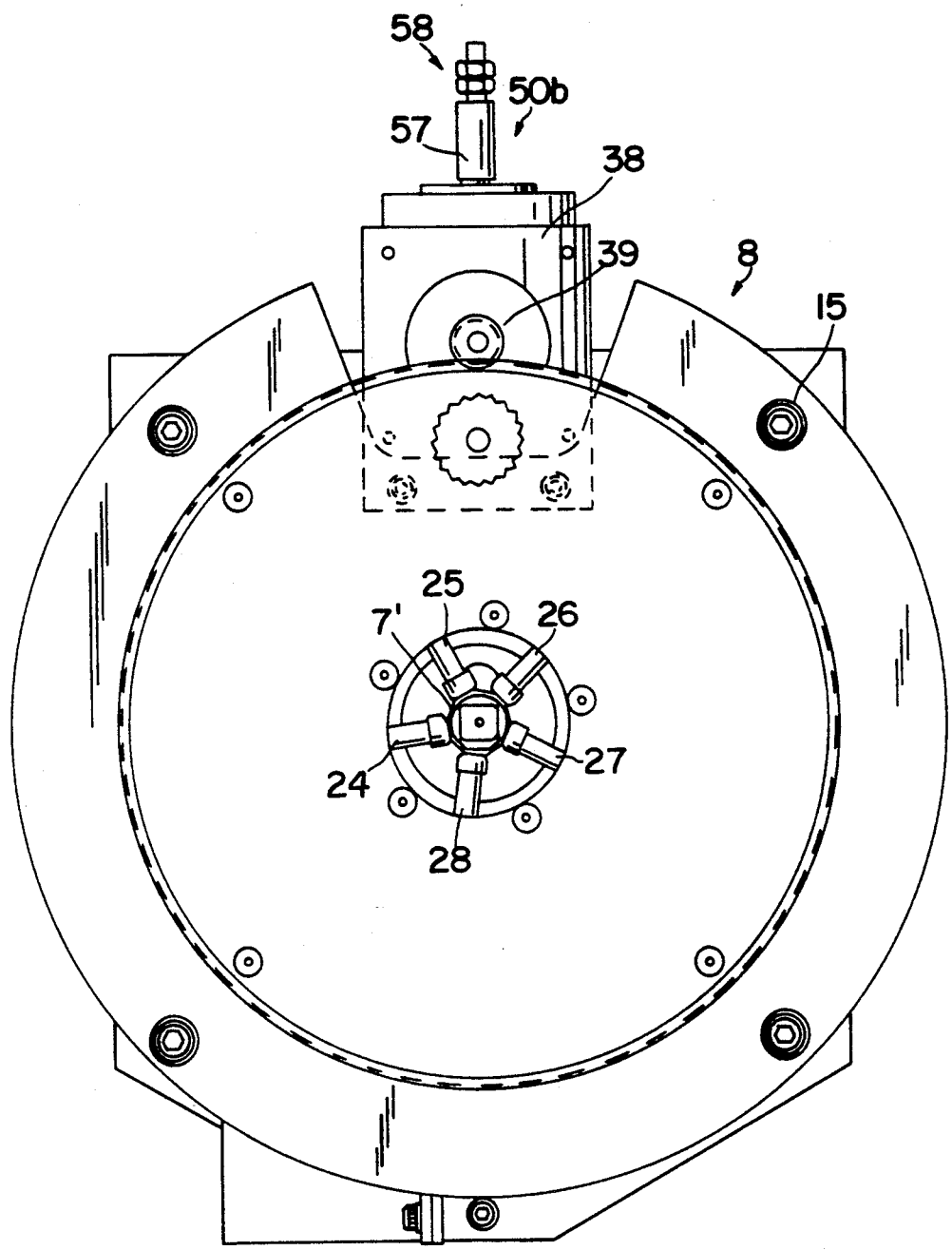
FIG. 4 shows a horizontal view of the engraving machine according to FIG. 2.

For an effective handling service according to FIG. 1, an effectively functioning engraving machine according to FIGS. 2-4 is required. The engraving machine comprises a frame with a base plate 12, a top plate 13 and corner pins (corner parts) 14, 15, 16 and 17 holding the plates together. The plate 12 has a multi-sided horizontal section and the plate 13 has an essentially round horizontal section. The plate 13 is provided with a central part 13a which is displaced parallel in the longitudinal section according to FIG. 2 and on whose top side there is a depression 13b. On the top side of the plate 13 there is arranged a rotatable member 18 which is provided with a thickened central part 18a via which the member 18 is rotatably mounted in the depression 13b. The bearing comprises a ball bearing 19 which is secured in a bushing 20 which in turn is secured in the part 13a. The member 18 is in turn applied on the bearing 19. The axis of rotation of the member is indicated by 21, and the rotatable member can be essentially discshaped. The plate 13 and the member 18 are provided with central recesses 22 and 23 respectively. In the recess 23 there are attachment members 24, 25, 26, 27 and 28 for the article 7' (see FIG. 4). The attachment members are pegs or pins longitudinally displaceable in the plane of rotation and are each provided with a cap 29 of a material which does not damage the article when the latter is secured in the attachment. The material of the cap can consist of rubber, non-rigid plastic and the like.

The pins 24-28 can be locked in different longitudinal displacement positions by means of locking members comprising a guide pin 30 and locking disc 31, which is provided with recesses 31a for the guide pins 30. There is also a manually actuable maneuverings part 32 which acts via a shaft 33 on a gear wheel 34 whose teeth are in engagement with teeth arranged in the outer edge of the locking disc 13 in order to permit displacement of the locking disc 31 in the plane of rotation and, thus, longitudinal displacement of the pins 24-28 to different longitudinal displacement positions in which they can cooperate with outer surfaces of articles 7' of different external diameters. The ball bearing 19 is closed in by means of a bushing 35 and a radial seal 36. The member is provided with a cover 37 which has a central recess 37a.

The article/ring can be secured in the attachment 24-28 via the recess 37a and the recess 23. The member 18 is provided with an outer gear ring 18b. A first control member in the form of a motor (for example a stepping motor) 38 acts on the member for the purpose of turning it in both directions of rotation by means of a gear wheel 39 which cooperates with the gear ring 18b.

A device 40 is arranged so as to extend from below through the recesses 22 and 35a and into the recess 23. It supports an engraving head 40a with an engraving needle 41 which is held in place by means of a pin 42. The device can be tilted on the one hand about a bearing axis 43 at its central part, and on the other hand can be raised and lowered relative to the rotatable member 18. The movement of the device 40 is essentially at right angles to the plane of rotation of the member 18. The raising and lowering are obtained by means of a part 44 which is designed as a first lever and is mounted on a bearing axle 45 which in turn is arranged on a par-t 46 which is secured (by screws) in the frame plate 13. The part 44 supports the device 40 at its first end 44a and is provided at its other end 44b with a toothed arc 44c. A control member in the form of a motor (for example a stepping motor) 47 is designed to rotate the part 44 about the axle 45 via a gear wheel 48 which cooperates with the toothed arc 44c and is therefore designed to produce the raising and lowering movements of the device 40.

The device 40 can also be designed as a lever, here called the second lever, which supports the engraving head 40a at its first end and can cooperate at its other end on the one hand with a tensile spring 49 and on the other hand with an electromagnet 50. The latter is arranged on a displaceable slide 51. The displacement is achieved by means of a unit, for example a motor 52, whose shaft 52a supports a threaded end part 52b which cooperates with an internal thread 53a in a part 53 which is connected to the slide 51. The slide is mounted in ball bearings in a known manner (not shown). By means of the rotation of the motor 52, its end is threaded into or out of the internal thread 53a, resulting in the slide with the electromagnet being displaced towards or from the other end 40b of the device 40. Different starting positions can be obtained in this way for the degree of tilting of the device 40 about the axis 43, resulting in the fact that the engraving needle or the like can be set in relation to the inner surfaces of articles with different ring thicknesses (ring material thicknesses).

The tensile spring 49 effects the application pressure of the needle 41 against the material of the article. The electromagnet lifts the needle when it is activated (=position according to FIG. 2) counter to the action of the spring 49. The spring is tensioned between an attachment 54 on the plate 12 and a stud 55 on the device 40. The electromagnet 50 is provided with an armature with projecting ends 50a and 50b. A link arm 56 connects the end 50a to the device 40. The bearing axles for the arm 56 are indicated by 56a and 56b. At the end 50b there is a bushing 57, determining the stroke length of the electromagnet, and nuts 58. The electromagnet is shown in the activated state in which it acts on the device 40 counter to the action of the spring 49 in such a way that the needle 41 on the device takes up a position within the inner surface of the article. When the electromagnet is deactivated, the spring acts on the device in such a way that the needle 41 presses into the ring material with a force which in the present case is chosen at about 2 Kp.

The function of parts not described (retaining screws etc.) emerges clearly from the drawing and is not described here. The computer equipment can be set up by known techniques and can operate with known software and will therefore not be described in greater detail here.

The function of the engraving machine is as follows. Instructions on ring thickness, typeface etc. are fed into the input means 10 (see FIG. 1). The article is secured in the engraving machine. The computer equipment provides control signals iS which can include signals for adjusting the machine to the dimensions of individual article and also control signals for the engraving which is to be carried out.

The adjustment signals act on the motor 52 which sets the slide 51 (the electromagnet 50) to the particular ring material thickness, i.e. the slide/electromagnet is set in a displacement position in relation to the end 40b of the device in such a way that the device is given an initial position for the particular ring material thickness in which the needle in the activated position of the electromagnet has the optimum height over the inner surface of the ring for the engraving. Thereafter (electromagnet still activated) the motors 38 and 52 are supplied adjustment signals by which the needle is placed above the point on the inner surface of the ring where the engraving is to be started. The engraving can then be started, and this is brought about by the electromagnet 50 being deactivated. The tensile spring 49 then acts on the device 40 in such a way that the needle 41 is pressed into the article material at a force determined by the spring. The engraving is then carried out by means of the motors 38 and 47 and the electromagnet 50 being supplied with control signals depending on the design of the engraving. When the engraving is complete, the electromagnet is held in the activated position (needle raised) and the article can be removed.

In the exemplary embodiment, an article has been shown with surfaces which are curved in one direction and straight in the direction at right angles to this direction. Other bend or curve configurations are possible. The equipment can also be designed in such a way that engraving can be carried out on the outside of ring-shaped articles, etc.

The invention is not limited to the embodiment above by way of example, but can be subjected to modifications within the, scope of the following patent claims and the inventive concept.

I claim:

1. An engraving machine for engraving an article having a curved surface, said machine being controlled by computer-generated control signals and comprising:
    frame means;
    a substantially planar member rotatably supported on said frame means for rotation within the plane of said planar member and about an axis;
    attachment means secured to said planar member for rotatably holding said article for rotating said curved surface about said axis;
    rotation means secured to said frame means and operatively connected to said planar member for rotating said planar member with its plane and about said axis in response to said computer-generated control signals;
    an engraving member operatively connected to said frame means for moving axially and radially with respect to the curved surface of an article mounted within said planar member in response to said computer-generated control signals;
    means secured to said frame means for moving said engraving member axially and radially; and
    a computer for generating and coordinating said computer-generated control signals for engraving said article.

2. The engraving machine according to claim 1 wherein movements of said engraving member are controlled at right angles with respect to said curved surface.

3. The engraving machine according to claim 1 wherein said rotation means comprises a motor for driving the planar member through first cooperating members including a gear wheel and gear ring.

4. The engraving machine according to claim 1 wherein the application of said engraving member against said curved surface for carrying out the engraving is effected by means of a spring force.

5. The engraving machine according to claim 1 wherein raising of the engraving member applied to the curved surface is effected by means of an electromagnet.

6. A method for engraving an article having a curved surface at an order site and by using a computer-controlled engraving machine including a rotatable member, an engraving member and means for controlling rotation of said rotatable member and for controlling movements of said engraving member in coordination with each other, said method comprising the steps of:
1) supplying instructions to said order site regarding the ordered article to be produced or selected and also engraving instructions;
2) securing the ordered article in said rotatable member of said engraving machine;
3) imputing said engraving instructions into a computer unit;
4) controlling engraving operations of said engraving machine by output control signals supplied by said computer unit to means for effecting rotation of said rotatable member and to means for effecting axial and radial movements of said engraving member;
5) coordinating by said computer signals rotation of said rotatable member supporting said article with movements of said engraving member.

7. The method according to claim 6 wherein movements of said engraving member are controlled at right angles with respect to said curved surface.

8. The engraving method according to claim 6, wherein an application of said engraving member against said curved surface for carrying out the engraving is effected by means of a spring force.

9. A method for engraving an article having a curved surface at an order site to which instructions regarding the article and the engraving are sent and wherein an article corresponding to the ordered article is produced, or is selected from among articles produced beforehand, said engraving method comprising the steps of:
1) supplying engraving instructions to a computer unit;
2) securing a selected article in a rotatable member of an engraving machine said rotatable member being rotatable in its plane and about an axis;
3) supplying control signals based on said engraving instructions from said computer unit to first and second control means;
4) controlling rotation of said rotatable member and controlling movements of a device supporting an engraving member in coordination with rotation movements of said rotatable member by said first and second control means to obtain an engraving corresponding to the engraving instructions on the curved surface of the article.

10. The engraving method according to claim 9 further comprising controlling said engraving member substantially at right angles to the plane of rotation of the article secured on said rotatable member and wherein the device supporting the engraving member extends through a central recess in the rotatable member.

* * * * *